United States Patent [19]
Asada

[11] Patent Number: 5,966,009
[45] Date of Patent: Oct. 12, 1999

[54] ELECTROMAGNETIC ACTUATOR AND MANUFACTURING METHOD THEREFOR

[75] Inventor: Norihiro Asada, Urawa, Japan

[73] Assignee: The Nippon Signal Co., Ltd., Tokyo, Japan

[21] Appl. No.: 08/981,245

[22] PCT Filed: Apr. 26, 1996

[86] PCT No.: PCT/JP96/01148

§ 371 Date: Dec. 22, 1997

§ 102(e) Date: Dec. 22, 1997

[87] PCT Pub. No.: WO97/41632

PCT Pub. Date: Nov. 6, 1997

[30] Foreign Application Priority Data

Dec. 28, 1994 [JP] Japan ................................ 6-327369

[51] Int. Cl.$^6$ ........................... G01R 13/38; G01R 13/40
[52] U.S. Cl. ................................. 324/97; 324/96
[58] Field of Search .................. 29/595, 596; 438/381, 438/29; 324/97, 96

[56] References Cited

U.S. PATENT DOCUMENTS

| | | | |
|---|---|---|---|
| 4,421,381 | 12/1983 | Ueda | 324/97 |
| 4,937,226 | 6/1990 | Nishiguchi | 438/2 |
| 5,116,457 | 5/1992 | Jerman | 438/53 |
| 5,767,666 | 6/1998 | Asada | 324/97 |

FOREIGN PATENT DOCUMENTS

| | | |
|---|---|---|
| 60-107017 | 6/1985 | Japan . |
| 7-175005 | 7/1995 | Japan . |
| 7-176255 | 7/1995 | Japan . |
| 7-218857 | 8/1995 | Japan . |
| 8-166289 | 6/1996 | Japan . |

OTHER PUBLICATIONS

Toshimitsu Hirai, "Practical Laser Technics", Kyoritsu Publishing Company, pp. 210–212, Dec. 10, 1987.

*Primary Examiner*—Josie Ballato
*Assistant Examiner*—Jose M. Solis
*Attorney, Agent, or Firm*—Finnegan, Henderson, Farabow, Garrett & Dunner, L.L.P.

[57] ABSTRACT

A portion of a torsion bar (6) for axially supporting a movable plate (5) of a planar electromagnetic actuator, is made conducting by diffusing boron therein in a high concentration. An external power source can thus be electrically connected to a planar coil (7) via the torsion bar (6) itself. As a result, the possibility of disconnection faults in the electrical wiring due to back and forth twisting movement of the torsion bar is eliminated, thus improving the durability and reliability of the electromagnetic actuator.

8 Claims, 7 Drawing Sheets

(a)

(b)

(c)

(d)

(e)

(f)

(g)

(h)

(i)

(j)

(k)

(ℓ)

ELECTROMAGNETIC ACTUATOR AND MANUFACTURING METHOD THEREFOR

TECHNICAL FIELD

The present invention relates to an electromagnetic actuator in which miniaturization has been realized through the use of semiconductor manufacturing technology, and to a manufacturing method therefor. In particular the invention relates to improvements in electromagnetic actuators for preventing disconnection of a drive coil for driving a movable plate.

BACKGROUND ART

Heretofore as a very small size electromagnetic actuator which utilizes semiconductor technology, there is for example, as proposed by the present inventor, the planar type mirror galvanometer (Japanese Patent Application Nos. 5-320524 and 6-9824), the planar type electromagnetic relay (Japanese Patent Application No. 5-320525), or the optical detecting instrument (Japanese Patent Application No. 6-310657).

A description of such conventional electromagnetic actuators is given below using as an example, a planar type mirror galvanometer.

Mirror galvanometers are used for example in laser scanners which deflection scan a laser beam, operating on the theory that when an electrical current is passed through a movable coil arranged in a magnetic field, an electromagnetic force is generated due to the interaction between the electrical current and the magnetic field, producing a rotational force (torque) proportional to the electrical current. The construction involves a device utilizing galvanometer theory where a movable coil rotates to an angle where the torque and a spring force are in equilibrium, the presence and size of a current being detected by an indicator needle swung by the movable coil. However instead of the indicator needle which rotates integrally with the movable coil, a reflecting mirror is provided.

Conventional practical mirror galvanometers use for example a movable piece of iron arranged in a magnetic field instead of the movable coil, with a magnetic path formed around the periphery of the movable piece of iron by means of a magnetic body including two permanent magnets and four magnetic poles. The magnetic flux between the poles is altered by changing the size and direction of a current flowing in a drive coil wound around the magnetic body, so that a reflecting mirror is swung by the movable piece of iron, to thus deflection scan a laser beam (see for example "Practical Laser Technology", Kyoritsu Publishing Company, Dec. 10, 1987, p210–212).

With the conventional mirror galvanometer however, miniaturization is difficult due for example to the drive coil being mechanically wound. There is thus the problem that miniaturization of laser scanning systems using such mirror galvanometers, and miniaturization of laser application equipment using such systems becomes difficult.

In order to solve this problem, the present inventors proposed the beforementioned very small thin type planar mirror galvanometer.

This planar type mirror galvanometer is discussed below.

With this planar type mirror galvanometer; a silicon substrate has integrally formed therewith, a planar movable plate, and a torsion bar at a central position of the movable plate for axially supporting the movable plate so as to be swingable in a perpendicular direction relative to the silicon substrate. A planar coil for producing a magnetic field by means of an electric current, is provided on an upper face peripheral edge portion of the movable plate, and a fully reflecting mirror is provided on an upper face central portion which is surrounded by the planar coil of the movable plate. A pair of electrode terminals for electrically connecting to the planar coil via a torsion bar portion, are provided on the silicon substrate side which supports the movable plate. Moreover, permanent magnets forming pairs with each other, are secured at the periphery of the movable plate so that a static magnetic field generated thereby acts on the planar coil portions located on the opposite ends of the movable plate which is parallel with the axial direction of the torsion bars. With the abovementioned patent applications, the pairs of permanent magnets are respectively located above and below the opposite end portions of the movable plate, the construction being such that the static magnetic fields generated between the pairs of permanent magnets intersect the drive coil in predetermined directions.

Operation of such a planar type mirror galvanometer is as follows.

A magnetic field is formed by means of the permanent magnets at opposite ends of the movable plate, in a direction so as to intersect the planar coil lying along the planar face of the movable plate. When a current flows in the planar coil positioned in this magnetic field, a magnetic force acts in a direction according to Fleming's left hand rule for current, magnetic flux density, and force, on the opposite ends of the movable plate in proportion to the current density and magnetic flux density of the planar coil, so that the movable plate is rotated. At this time, the torsion bars are twisted with the rotation of the movable plate, producing a spring reaction force, so that the movable plate rotates to a position where the magnetic force and the spring reaction force are in equilibrium. Since the angle of rotation of the moveable plate is proportional to the current flowing in the planar coil, then if the current flowing in the planar coil is controlled, the rotation angle of the movable plate can be controlled.

Consequently, the direction of reflection of a laser beam incident on a fully reflecting mirror in a plane perpendicular to the axis of the torsion bar, can be freely controlled. Hence if the displacement angle of the fully reflecting mirror is continuously cycled back and forth, then laser beam scanning can be effected.

Moreover there is also a two axis mirror galvanometer provided with a frame like outer movable plate axially supported on a silicon substrate by means of first torsion bars, and a planar inner movable plate axially supported on the outer movable plate by means of second torsion bars aligned perpendicular to the first torsion bars, and having a fully reflecting mirror on an upper central surface of the inner movable plate.

This two axis construction has the advantage that if a current is passed through both a planar coil on the upper face of the outer movable plate, and a planar coil on the upper face of the inner movable plate, then the outer movable plate and the inner movable plate rotate in directions which are perpendicular to each other. Hence if a laser beam is deflection scanned by the fully reflecting mirror, then two dimensional scanning can be carried out.

In the case where a current is only passed through one of the planar coils, the movement is the same as for the single axis construction.

With such planar type mirror galvanometers, in the case of both the single axis and the two axis arrangements, wiring for connecting the planar coil provided on the upper face of the movable plate to electrode terminals on the silicon substrate side which supports the movable plate, has heretofore been patterned on the torsion bar portion.

There is thus the likelihood of disconnection of the metal material of the planar coil due to metal fatigue resulting from the back and forth twisting movement of the torsion bar when the movable plate is being driven. Hence there is the problem that the life of the mirror galvanometer is limited by the fatigue strength of the planar coil.

The present invention takes into consideration the above situation with the object of providing an electromagnetic actuator and a method of manufacture therefor, which eliminates the occurrence of drive coil disconnection faults.

DISCLOSURE OF THE INVENTION

Accordingly with the present invention, with an electromagnetic actuator having a semiconductor substrate with a movable plate, and a torsion bar for axially supporting the movable plate so as to be swingable relative to the semiconductor substrate integrally formed therewith, and incorporating a drive coil provided on a peripheral edge portion of the movable plate, and a magnetic field generating device for applying a static magnetic field to the drive coil, the construction being such that the movable plate is driven by a magnetic force produced by passing a current through the drive coil, at least one portion of the torsion bar is formed so as to be electrically conducting, and an external power source and the drive coil are electrically connected by this conducting region.

With such a construction, disconnection faults in the electrical wiring due to metal fatigue caused by the twisting movement of the torsion bar no longer arise since the polycrystalline structure metal electrical wiring on the torsion bar portion is eliminated. Moreover, since the semiconductor substrate used here is of a monocrystalline structure, then if used within the elastic limit region, the life is semi-permanent. Consequently the life of the electromagnetic actuator can be extended.

Furthermore, the whole of the torsion bar may be made conducting.

Moreover, in the case of a mirror galvanometer wherein a reflecting mirror is provided on a central portion surrounded by the drive coil of the moveable plate, then it is possible to provide a very small size thin type mirror galvanometer.

Furthermore, there is a mirror galvanometer wherein the movable plate comprises a frame like outer movable plate and a planar inner movable plate, and the torsion bar comprises a first torsion bar for axially supporting the outer movable plate on the semiconductor substrate, and a second torsion bar aligned axially at right angles to the first torsion bar, for axially supporting the inner movable plate inside the outer movable plate, and a first drive coil is provided on an upper face of the outer movable plate, and a second drive coil is provided on an upper face peripheral portion of the inner movable plate; and the reflecting mirror is provided on a central portion of the inner movable plate which is surrounded by the second drive coil.

With such a construction, a two axis mirror galvanometer can be formed with the advantage that deflection scanning of a laser beam or the like can be carried out in two dimensions.

Moreover, the first and second torsion bars may be separated into two overall electrically conducting parts which are arranged close together and electrically insulated from each other.

Furthermore with a method of manufacturing an electromagnetic actuator comprising: a step of forming a movable plate which is axially supported on a semiconductor substrate so as to be swingable, by piercing the semiconductor substrate by anisotropic etching from a lower face to an upper face excluding a portion forming a torsion bar; a step of forming a drive coil on an upper face periphery of the movable plate; and a step of securing a magnetic field generating device for applying a static magnetic field to the drive coil; the movable plate is formed by the anisotropic etching after forming on at least a part of a portion forming the torsion bar a conducting region in which a P-type impurity is diffused in high concentration, and when the drive coil is formed, then at the same time electrode terminal portions are formed on opposite end portions of the conducting region for respectively connecting the conducting region to an external power supply side and to the drive coil side.

Moreover, one of; boron, aluminum, gallium, and indium may be used for the P-type impurity.

If a conducting region is formed in this way by diffusing in high concentration, a P-type impurity such as one of boron, aluminum, gallium, and indium on at least a part of a portion forming the torsion bar, then when the movable plate is formed by anisotropic etching, the etching speed due to the specific etching liquid is slowed considerably at the conducting region where the P-type impurity in the part of the portion forming the torsion bar is diffused in high concentration. Hence the torsion bar forming portion remains, thus forming a torsion bar having a conducting region.

The volume resistivity of the conducting region of the torsion bar formed in this way is approximately $10^{-3}$ $\Omega$ cm. This resistivity is extremely low compared to the volume resistivity of $2.3 \times 10^5$ $\Omega$ cm for intrinsic silicon semiconductor, and is satisfactory for use as a power supply path for the drive coil.

By adding a step of forming a reflective mirror, then a very small and thin planar type mirror galvanometer can be produced.

BEST MODE FOR CARRYING OUT THE INVENTION

Embodiments of the present invention will now be described, with reference to the drawings.

Figure 1:
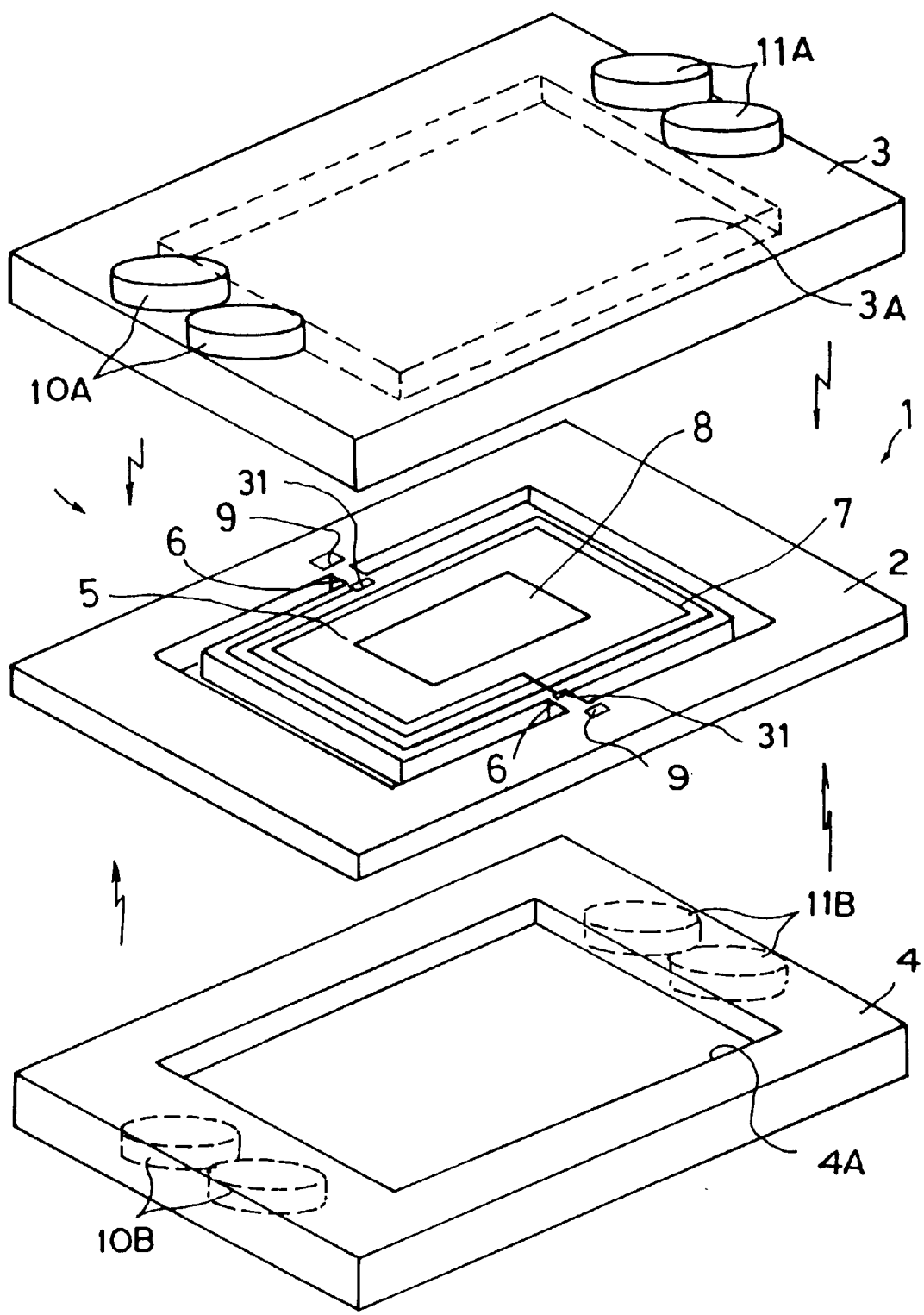
FIG. 1 is a schematic diagram of a first embodiment of an electromagnetic actuator according to the present invention.
Figure 2:
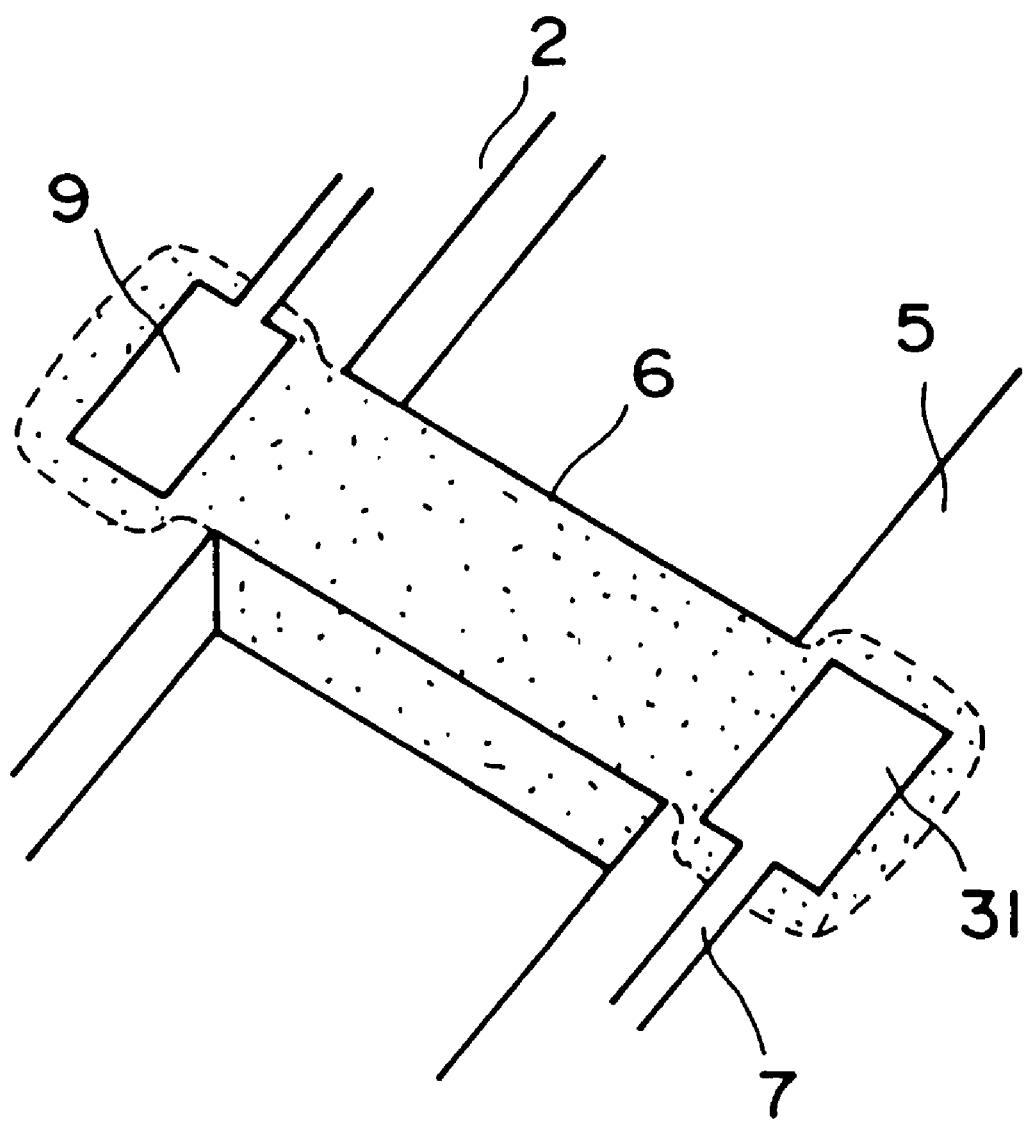
FIG. 2 is a schematic diagram of a torsion bar portion of the first embodiment.

FIG. 1 and FIG. 2 show the construction of a first embodiment according to the present invention applied to a single axis mirror galvanometer serving as an electromagnetic actuator.

In FIG. 1, a mirror galvanometer 1 has a triple layer construction with respective upper and lower glass substrates 3, 4 made for example from borosilicate glass or the like, anodic spliced to upper and lower faces of a silicon substrate 2, as indicated by the arrows in FIG. 1. The respective upper and lower glass substrates 3, 4 are provided on respective central portions thereof with recesses 3A, 4A, formed for example by ultrasonic machining. In this way, a swinging space can be ensured for a movable plate 5 described later, which is formed in the silicon substrate 2. The planar movable plate 5, and torsion bars 6 having conducting properties which is the feature of the present invention, for axially supporting the movable plate 5 at a central location thereof so as to be swingable in a perpendicular direction relative to the silicon substrate 2, are formed integrally with the silicon substrate 2 by anisotropic etching. The construction of the torsion bars 6 will be described later in detail, with reference to FIG. 2.

A planar coil 7 serving as a thin copper film drive coil for generating a magnetic field by means of an electric current, and electrode terminals 31, are formed on the upper face peripheral edge portion of the movable plate 5 using a coil electro-typing method or the like. A fully reflecting mirror 8 serving as a reflecting mirror is formed on an upper central portion of the planar face of the movable plate 5 which is surrounded by the planar coil 7, by aluminum vapor deposition. A pair of electrode terminals 9 are formed by a coil electro-typing method or the like on the upper face of the silicon substrate 2 to the side of the torsion bars 6, for electrically connecting to the electrode terminals 31 of the planar coil 7 via the portion of the torsion bars 6.

Cylindrical permanent magnets 10A, 10B and 11A, 11B forming pairs with each other are provided on the left and right ends (in FIG. 1) of the upper and lower glass substrates 3, 4, so as to produce a static magnetic field at the planar coil 7 portions on the opposite ends of the movable plate 5 which are parallel with the axes of the torsion bars 6. The permanent magnets 10A, 10B forming pairs with each other, are arranged for example with the lower side the north pole and the upper side the south pole, while the permanent magnets 11A, 11B forming pairs with each other, are arranged opposite to this with the lower side the south pole and the upper side the north pole. Here the permanent magnets 10A, 10B and 11A, 11B correspond to the static magnetic field generating device.

Next is a detailed description of the torsion bars 6 which are the feature of the present invention, with reference to FIG. 2. The respective torsion bar 6 portions are constructed the same, and hence only one of the torsion bar portions is described here.

With the torsion bar 6 portion of the present embodiment, a P-type impurity such as boron is diffused in high concentration so that the whole body of the torsion bar 6 is conducting. Moreover, an electrode terminal 9 for electrically connecting to an external power source (not shown in the figure) is formed in a conducting region indicated by the broken line in FIG. 2, close to the end portion of the electrically conducting torsion bar 6 on the semiconductor substrate 2 side. Moreover, an electrode terminal 31 for electrically connecting to the planar coil 7 of the moveable plate 5 is formed in a conducting region indicated by the broken line in FIG. 2, close to the end portion of the torsion bar 6 on the movable plate 5 side.

With such a construction, power is supplied to the planar coil 7 by electrical connection to an external power source via the conducting torsion bar 6. Moreover, if for example the boron impurity concentration is $10^{20}/cm^3$, then the volume resistivity of the conducting region of the torsion bar 6 is approximately $10^{-3}$ $\Omega$ cm, which is extremely low compared to $2.3 \times 10^5$ for the volume resistivity of intrinsic silicon semi-conductor, and hence conductivity is high. Therefore sufficient performance as a conducting path is possible.

With such a construction wherein the torsion bar 6 is made conducting so that power is supplied to the planar coil 7 via the torsion bar 6 itself, it is no longer necessary to provide the polycrystalline structure metal wiring pattern on the torsion bar 6. Hence disconnection faults of the metal wiring due to twisting movement of the torsion bar 6 can be eliminated. Moreover, since the semiconductor substrate is of a monocrystalline structure, then if used within the elastic limit region, the life is semi-permanent. Consequently the life of a planar type mirror galvanometer can be extended and reliability improved.

The theory of operation of the mirror galvanometer of the present embodiment is the same as for the conventional device, and hence description is here omitted.

Figure 3:
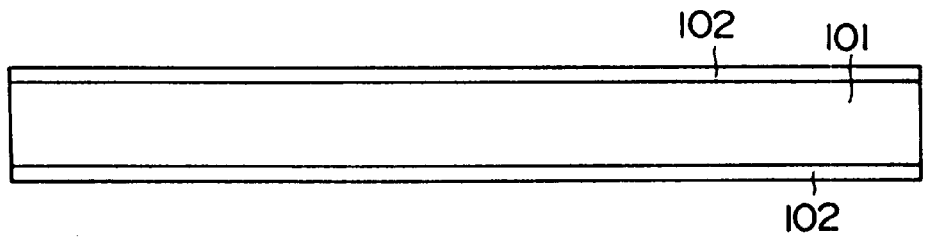
FIGS. 3(1) to 3(3) show a diagram for explaining a manufacturing step of the first embodiment.
Figure 3:
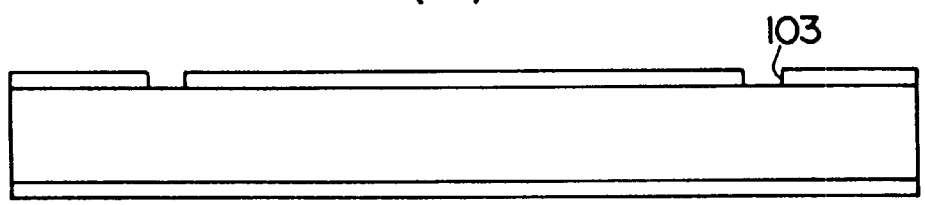
Figure 3:
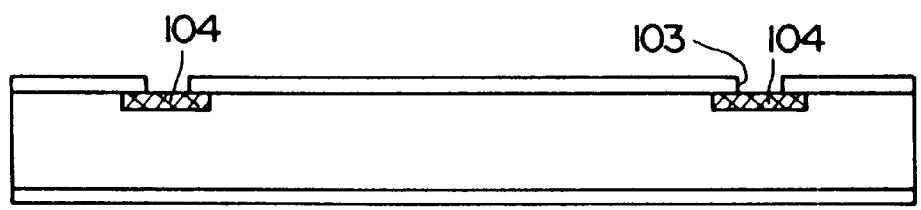
Figure 3:
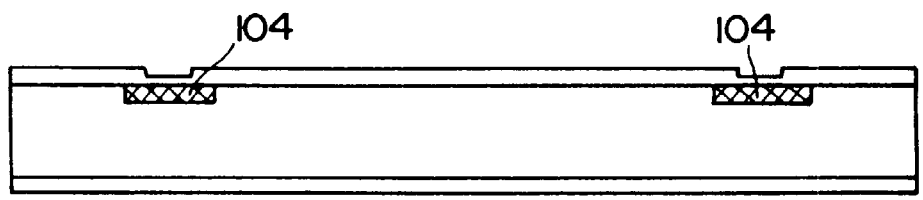
Figure 3:
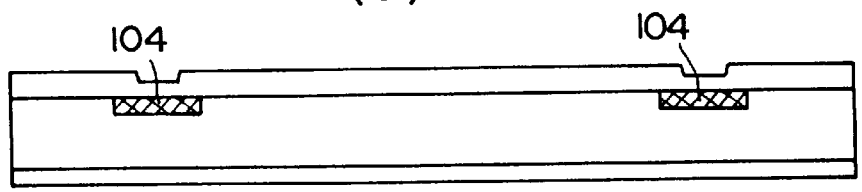
Figure 3:
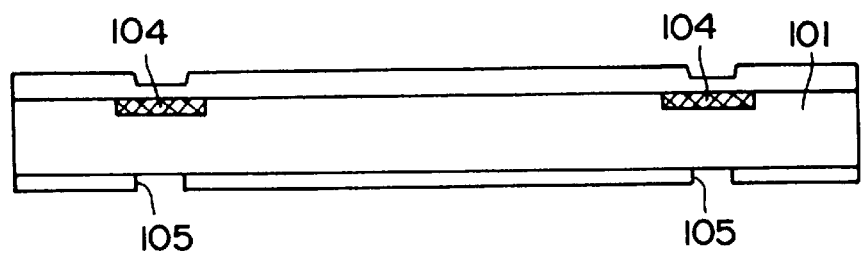
Figure 3:
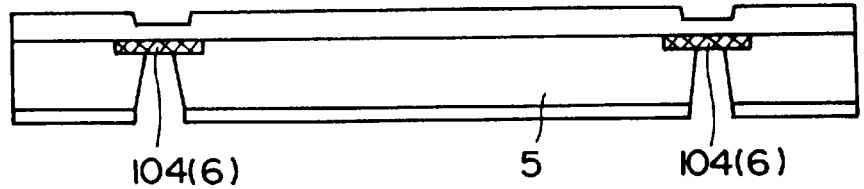
Figure 3:
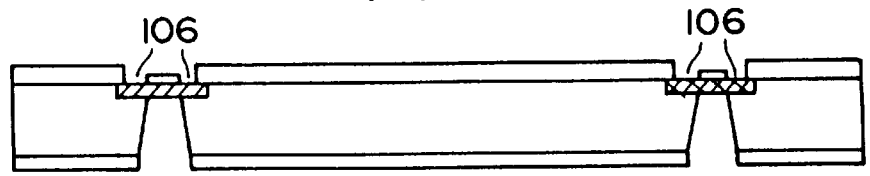
Figure 3:
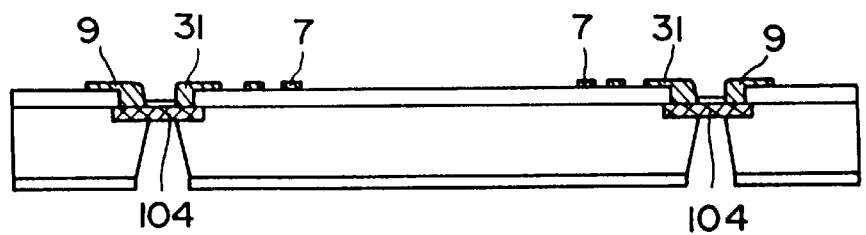
Figure 3:
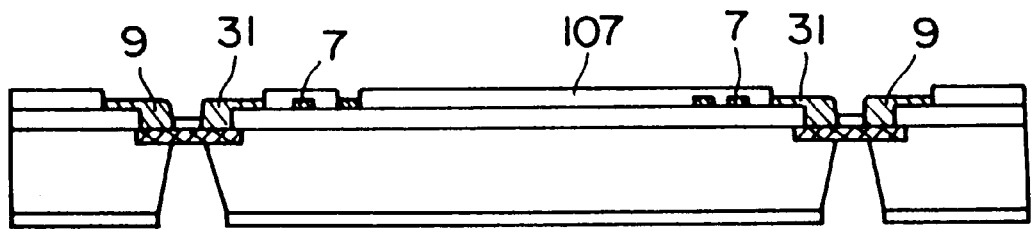
Figure 3:
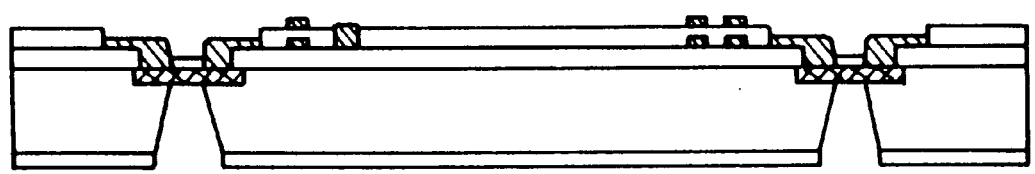
Figure 3:
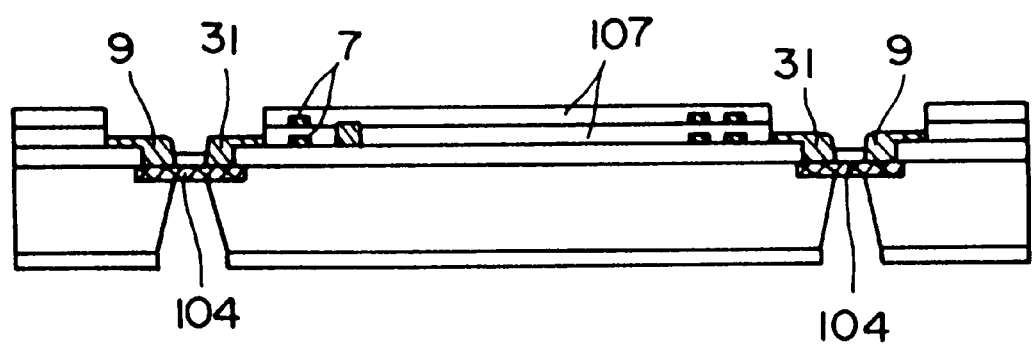

Next is a description of the manufacturing steps of the torsion bar portion of the mirror galvanometer of the first embodiment, with reference to FIG. 3.

At first, the upper and lower faces of a silicon substrate 101 are thermally oxidized to form an oxide film 102 (step a).

An opening 103 for impurity diffusion is then formed by removing the oxide film on the front face side of the portion forming the torsion bar (step b). A boron impurity is then diffused from the opening in high concentration to form a conducting region 104 (step c).

An oxide film is then formed on the conducting region 104 by thermal oxidation at 1100° C. for one hour (step d). After this, an $SiO_2$ film is formed on top by sputtering (step e).

A pattern of through holes 105 is then formed on the rear face side by photolithography. The oxide film at the portion of the through holes 105 is then removed by etching (step f), after which anisotropic etching is carried out on the through hole portion 105. In this way, the movable plate 5 portion is formed, and the conducting region 104 is not etched due to the $P^+$ etch stopping action, thus simultaneously forming the conducting torsion bar 6 comprising the conducting region 104 (step g). If instead of boron (B), aluminum (Al), gallium (Ga), or indium (In) or the like is used for the P-type impurity, it is still possible to utilize the $P^+$ etch stopping action. Moreover, in the case where forming is carried out without using the $P^+$ etch stopping action, it is possible to use phosphorus (P), arsenic (As), antimony (Sb), bismuth (Bi), or the like as the P-type impurity.

After this, the oxide film in the portion forming the electrode terminals is removed, to thereby form contact holes 106 (step h).

The planar coil 7 and the electrode terminals 9 and 31 are then formed on the front surface oxide film 102 by the heretofore known coil electro-typing method (step i).

With the coil electro-typing method, a nickel layer is formed on the front surface of the silicon substrate 101 by nickel sputtering, and a copper layer is then formed by electroplating or sputtering. The portions corresponding to the planar coil, and the electrode terminals are then masked with a positive type resist, and copper etching and nickel etching successively carried out, after which the resist is removed. Copper electroplating is then carried out so that the whole periphery of the nickel layer is covered with copper, thus forming a copper layer corresponding to the planar coils and the electrode terminals. Then a negative type plating resist is spread on the portion excluding the copper film, after which copper electroplating is carried out to thicken the copper layer, thereby forming the planar coil and the electrode terminals.

An insulating layer 107 of for example a photosensitive polyimide for insulation from a second layer planar coil is then formed. This insulating layer 107 is formed excluding the electrode terminal portions, and the coil connecting portions for the first layer and the second layer (step j).

The planar coil of the second layer is then formed on the insulating layer 107, again by the coil electro-typing method (step k). An insulating layer 107 of for example a photosensitive polyimide is then formed thereon (step l).

After this, a fully reflecting mirror 8 is formed on a central portion of the upper face of the movable plate 5 by aluminum vapor deposition. An upper glass substrate 3 and a lower glass substrate 4 are then respectively joined to the upper and lower faces of the silicon substrate by anodic splicing. Permanent magnets are then mounted at predetermined locations on the upper and lower glass substrates 3, 4.

A second embodiment of the present invention applicable to a two axis mirror galvanometer will now be described.

With the single axis mirror galvanometer of the first embodiment, a single lead is sufficient for the torsion bar portion. However with the two axis mirror galvanometer, two leads are required for the torsion bar portion.

Figure 4:
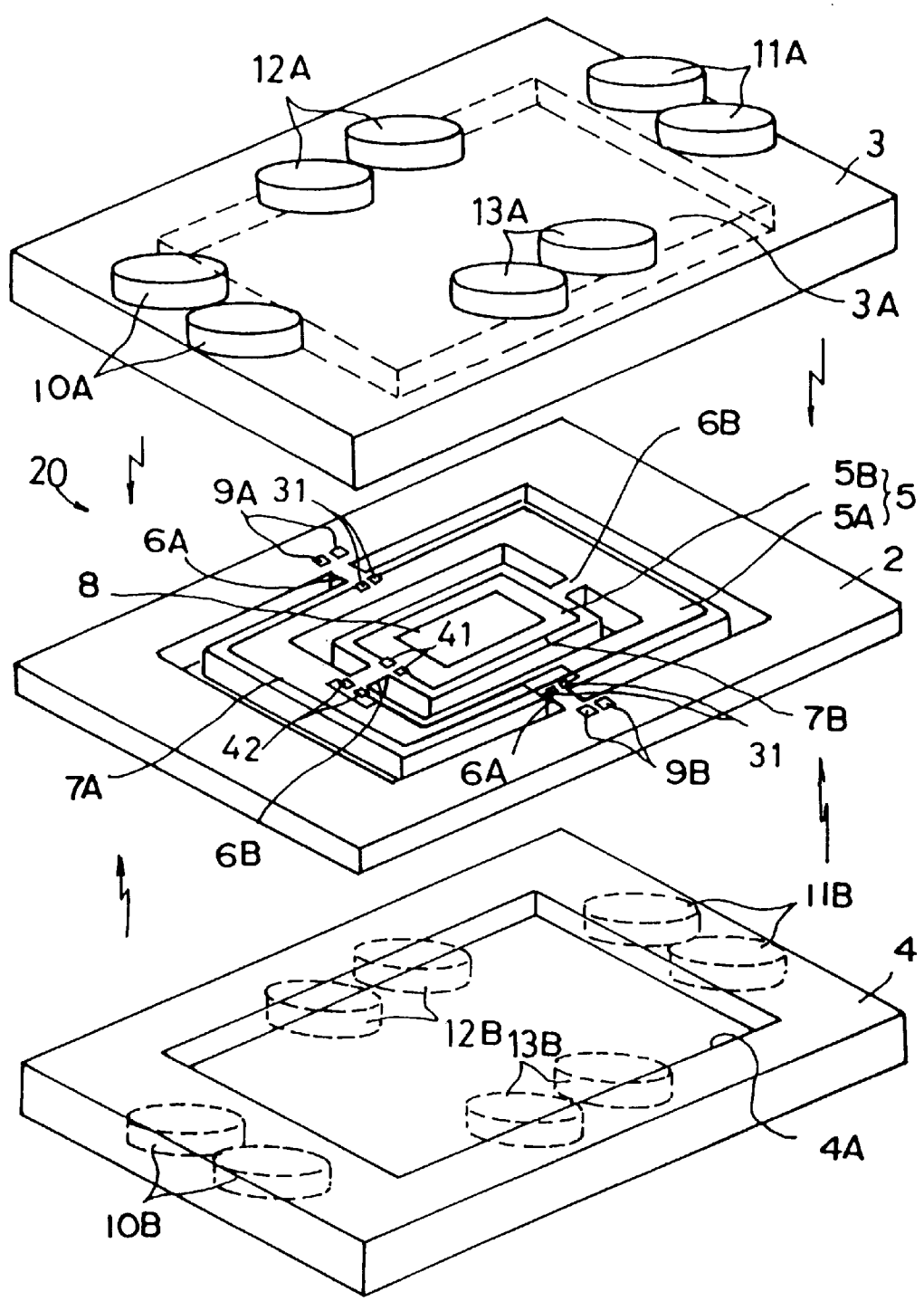
FIG. 4 is a schematic diagram of a second embodiment according to the present invention.
Figure 5:
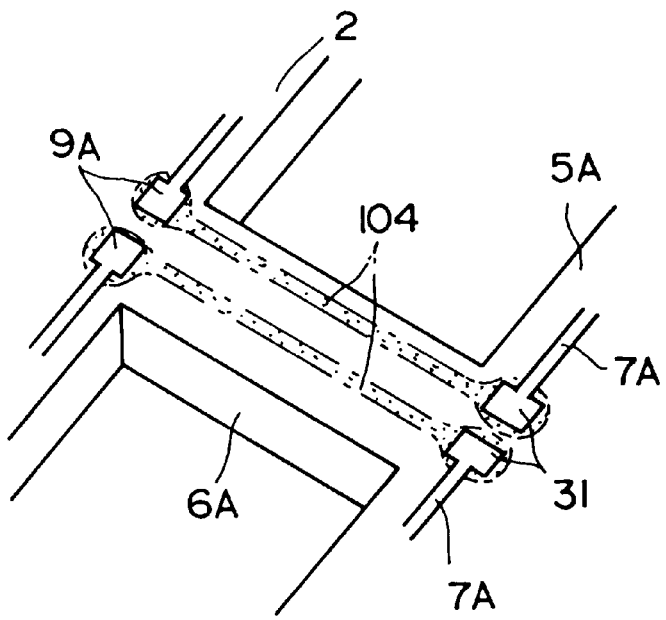
FIG. 5 is a schematic diagram of a torsion bar portion of the second embodiment.

FIG. 4 and FIG. 5 show the construction of a second embodiment of the present invention applicable to a two axis mirror galvanometer serving as an electromagnetic actuator. Elements the same as in the first embodiment are indicated with the same symbol.

As shown in FIG. 4, with the two axis mirror galvanometer 20, the movable plate 5 of the silicon substrate 2 comprises a frame shape outer movable plate 5A and a planar inner movable plate 5B. The outer movable plate 5A is axially supported on the silicon substrate 2 by first torsion bars 6A. The inner movable plate 5B is axially supported on the outer movable plate 5A by second torsion bars 6B which are formed mutually perpendicular to the first torsion bars 6A, 6A. Provided on the upper face of the outer movable plate 5A is a planar coil 7A (shown typically as a single line in FIG. 4, except in the vicinity of the electrode terminals) serving as a first drive coil, and electrode terminals 31 for electrically connecting to a pair of outer electrode terminals 9A on the silicon substrate 2, by way of part of one of the first torsion bars 6A. Moreover, provided on the upper face of the inner movable plate 5B is a planar coil 7B (shown typically as a single line in FIG. 4, except in the vicinity of the electrode terminals) serving as a second drive coil, and electrode terminals 41 for electrically connecting through one of the second torsion bars 6B and the outer movable plate 5A portion to a pair of inner electrode terminals 9B on the silicon substrate 2, by way of the other of the first torsion bars 6A. In addition, a fully reflecting mirror 8 is formed on a central portion of the inner movable plate 5B. Electrode terminals 42 are formed on lead ends of the coil on the outer movable plate 5A portion, for connecting to the planar coil 7B on the inner movable plate 5B by way of the second torsion bar 6B.

Now in the case of the two axis construction of the present embodiment, eight pairs of permanent magnets 10A~13A, and 10B~13B serving as static magnetic field generating devices are respectively located ion the upper and lower glass substrates 3, 4 as shown in FIG. 4. The permanent magnets 10A, 10B and 11A, 11B, produce a magnetic field for driving the outer movable plate 5A. Moreover, the permanent magnets 12A, 12B and 13A, 13B produce a magnetic field for driving the inner movable plate 5B.

FIG. 5 illustrates the construction of the portions of the first and second torsion bars 6A, 6B of the second embodiment. Since the construction of the respective portions of the torsion bars 6A, 6B are the same, here the description is only given for the portion of the torsion bar for connecting the planar coil 7A of the outer movable plate 5A to the electrode terminals 9A.

As shown in FIG. 5, two conducting regions 104 in parallel and spaced apart so as to be insulated from each other are formed in a portion of the torsion bar 6A by two impurity diffusions, as indicated by the chain lines in FIG. 5.

In this case, for a torsion bar 6A of approximately 300 $\mu$m in width, the width of the respective conducting regions 104 can be approximately 50 $\mu$m, and insulation of the two conducting regions 104 from each other can be realized without any difficulty using an inter element separation technique used in semiconductor manufacturing technology.

With such a construction, then as with the first embodiment, the life of a planar type mirror galvanometer can be extended and reliability improved.

With the portion of the second torsion bar 6B for connecting the planar coil 7B of the inner movable plate 5B to the lead of the coil on the outer movable plate 5A, then in FIG. 5, the electrode terminals 9A are in place of the electrode terminals 42, the electrode terminals 31 are in place of the electrode terminals 41, and the planar coil 7A is in place of the planar coil 7B.

Figure 6:
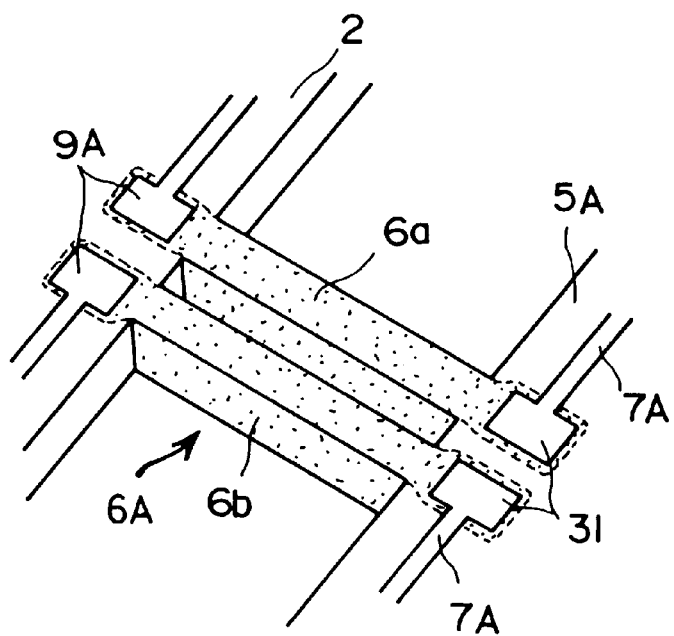
FIG. 6 is a schematic diagram of the main portions of a third embodiment according to the present invention.

The portion of the torsion bar may also be formed as in a third embodiment shown in FIG. 6.

With this embodiment, a central portion of the torsion bar 6A is pierced to give a separated construction with two torsion bars 6a, 6b close to each other. As with the first embodiment shown in FIG. 2, the respective torsion bars 6a, 6b are made conducting regions by diffusing an impurity throughout the whole body.

In this case, the spring reaction force characteristics of the torsion bar are different to those of the single torsion bar construction. Hence the relationship between the magnetic force and the spring reaction force is different to that for the single torsion bar case. However this has no effect on the operation as a mirror galvanometer, and has the same effect as with the first and second embodiments, of preventing disconnection of the coil. Hence the life of a planar mirror galvanometer can be extended and reliability improved.

Obviously in the case of the single axis mirror galvanometer also, a conducting region can be formed by diffusing an impurity in a portion of the torsion bar as shown in FIG. 5. Moreover, if the respective permanent magnets are fitted to another fixed part, then the upper and lower glass substrates 3, 4 are not really necessary.

With the present embodiment, the example has been given for application to a planar type mirror galvanometer, serving as the electromagnetic actuator. However, obviously this can be applied to electromagnetic actuators such as the above-mentioned planar electromagnetic relay, or optical detection units and the like.

With the above invention as described above, the construction is such that a portion of the torsion bar is made electrically conducting, and the external power source and the drive coil are electrically connected by way of the conducting region of the torsion bar. Therefore, a disconnection fault of the coil power supply lead due to back and forth twisting movement of the torsion bar can be prevented, and hence the durability and reliability of a planar type electromagnetic actuator can be improved.

INDUSTRIAL APPLICABILITY

With the present invention, the reliability of a very small type planar electromagnetic actuator can be improved so that the life and reliability of instruments which incorporate such planar type electromagnetic actuators can be improved. Industrial applicability is thus significant.

I claim:

1. An electromagnetic actuator having a semiconductor substrate with a movable plate, and a torsion bar for axially supporting the movable plate so as to be swingable relative to the semiconductor substrate integrally formed therewith, and incorporating a drive coil provided on a peripheral edge portion of said movable plate, and magnetic field generating means for applying a static magnetic field to said drive coil, the construction being such that said movable plate is driven by a magnetic force produced by passing a current through said drive coil, characterized in that an impurity is diffused on at least one portion of said torsion bar to form a conducting region, and an external power source and the drive coil are electrically connected by this conducting region.

2. An electromagnetic actuator according to claim 1, wherein the whole of said torsion bar is made to be a conducting region.

3. An electromagnetic actuator according to claim 1, being a mirror galvanometer having a reflecting mirror provided on a central portion surrounded by the drive coil of said moveable plate.

4. An electromagnetic actuator according to claim 3, wherein said movable plate comprises a frame like outer movable plate and a planar inner movable plate, and said torsion bar comprises a first torsion bar for axially supporting said outer movable plate on said semiconductor substrate, and a second torsion bar aligned axially at right angles to said first torsion bar, for axially supporting said inner movable plate inside said outer movable plate, and a first drive coil is provided on an upper face of said outer movable plate, and a second drive coil is provided on an upper face peripheral portion of said inner movable plate; and said reflecting mirror is provided on a central portion of the inner movable plate which is surrounded by said second drive coil.

5. An electromagnetic actuator according to claim 4, wherein said first and second torsion bars are separated into two overall conducting regions electrically conducting parts which are arranged close together and electrically insulated from each other.

6. A method of manufacturing an electromagnetic actuator, said method comprising: a step of forming a movable plate which is axially supported on a semiconductor substrate so as to be swingable, by piercing the semiconductor substrate by anisotropic etching from a lower face to an upper face excluding a portion forming a torsion bar; a step of forming a drive coil on an upper face periphery of the movable plate; and a step of securing a magnetic field generating means for applying a static magnetic field to the drive coil; characterized in that the movable plate is formed by said anisotropic etching after forming on at least a part of a portion forming the torsion bar, a conducting region in which a P-type impurity is diffused in high concentration, and when the drive coil is formed, then at the same time electrode terminal portions are formed on opposite end portions of said conducting region for respectively connecting said conducting region to an external power supply side and to the drive coil side.

7. A method of manufacturing an electromagnetic actuator according to claim 6, wherein said P-type impurity is one of; boron, aluminum, gallium, and indium.

8. A method of manufacturing an electromagnetic actuator according to claim 6, comprising a step of forming a reflecting mirror on a central portion of the movable plate which is surrounded by the drive coil.

\* \* \* \* \*